(12) United States Patent
Niemiec et al.

(10) Patent No.: US 11,682,214 B2
(45) Date of Patent: Jun. 20, 2023

(54) METHOD, SYSTEM AND COMPUTER PROGRAM PRODUCT FOR REDUCING LEARNING TIME FOR A NEWLY INSTALLED CAMERA

(71) Applicant: MOTOROLA SOLUTIONS, INC., Chicago, IL (US)

(72) Inventors: Pawel Niemiec, Rzeszow (PL); Alexander H Swanson, Perth (GB); Kuang Lin Chuang, Bayan Lepas (MY); Choon Kang Wong, Ipoh (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/449,953

(22) Filed: Oct. 5, 2021

(65) Prior Publication Data
US 2023/0103735 A1 Apr. 6, 2023

(51) Int. Cl.
| | |
|---|---|
| *G06V 20/52* | (2022.01) |
| *H04N 7/18* | (2006.01) |
| *G06V 10/147* | (2022.01) |
| *G06V 10/70* | (2022.01) |
| *G06F 18/21* | (2023.01) |

(52) U.S. Cl.
CPC .......... *G06V 20/52* (2022.01); *G06F 18/2163* (2023.01); *G06V 10/147* (2022.01); *G06V 10/70* (2022.01); *H04N 7/181* (2013.01); *G06V 2201/10* (2022.01)

(58) Field of Classification Search
None
See application file for complete search history.

(56) References Cited

U.S. PATENT DOCUMENTS

| | | |
|---|---|---|
| 6,741,655 B1 | 5/2004 | Chang et al. |
| 7,421,455 B2 | 9/2008 | Hua et al. |
| 7,555,165 B2 | 6/2009 | Luo et al. |
| 7,668,369 B2 | 2/2010 | Yen et al. |
| 7,742,625 B2 | 6/2010 | Pilu |
| 8,295,597 B1 * | 10/2012 | Sharma ................. G06V 20/41 382/173 |

(Continued)

FOREIGN PATENT DOCUMENTS

| | | |
|---|---|---|
| CN | 105184242 A | 12/2015 |
| CN | 107392100 B | 7/2020 |
| WO | 2014004901 A1 | 1/2014 |

OTHER PUBLICATIONS

M. A. Tehrani, R. Kleihorst, P. Meijer and L. Spaanenburg, "Abnormal motion detection in a real-time smart camera system," 2009 Third ACM/IEEE International Conference on Distributed Smart Cameras (ICDSC), 2009, pp. 1-7, doi: 10.1109/ICDSC.2009.5289359.

(Continued)

*Primary Examiner* — Reza Aghevli

(57) ABSTRACT

A method, system and computer program product for reducing learning time for a newly installed camera is disclosed. The method includes generating a new unusual activity model for the newly installed camera, based on portion(s) of existing and established unusual activity model(s) built for different older camera(s), where the existing and established unusual activity model(s) relate to at least one same static object appearing within Fields Of Views (FOVs) of the new and older cameras.

20 Claims, 4 Drawing Sheets

(56) References Cited

U.S. PATENT DOCUMENTS

| | | | | |
|---|---|---|---|---|
| 8,665,333 | B1* | 3/2014 | Sharma | G08B 13/19643 348/169 |
| 8,736,701 | B2 | 5/2014 | Marman et al. | |
| 8,744,912 | B2 | 6/2014 | Sechrist et al. | |
| 8,872,940 | B2 | 10/2014 | Marman et al. | |
| 9,041,800 | B2* | 5/2015 | Bell | H04N 7/181 382/103 |
| 9,165,070 | B2 | 10/2015 | Barsook et al. | |
| 10,789,485 | B2* | 9/2020 | Stawiszynski | H04N 23/611 |
| 10,867,495 | B1* | 12/2020 | Venetianer | G08B 13/19671 |
| 11,228,736 | B2* | 1/2022 | Stawiszynski | H04N 23/53 |
| 2007/0182818 | A1* | 8/2007 | Buehler | G08B 13/19641 348/143 |
| 2008/0100705 | A1 | 5/2008 | Kister et al. | |
| 2010/0002082 | A1* | 1/2010 | Buehler | G08B 13/19693 348/E7.085 |
| 2010/0157049 | A1* | 6/2010 | Dvir | G08B 13/19641 348/169 |
| 2012/0188333 | A1* | 7/2012 | Morison | G06F 3/04815 348/E7.001 |
| 2012/0288140 | A1* | 11/2012 | Hauptmann | G06T 7/292 382/103 |
| 2016/0019427 | A1* | 1/2016 | Martin | G06V 40/10 382/103 |
| 2016/0357762 | A1 | 12/2016 | Aghdashi et al. | |
| 2017/0078767 | A1 | 3/2017 | Borel et al. | |
| 2018/0063372 | A1* | 3/2018 | Rutschman | H04N 21/21805 |
| 2018/0285633 | A1 | 10/2018 | Alcock et al. | |
| 2019/0028721 | A1* | 1/2019 | Rutschman | G02B 13/02 |
| 2019/0311061 | A1* | 10/2019 | Peterson | G06F 16/2477 |
| 2022/0124453 | A1* | 4/2022 | Stauff | H04W 4/029 |

OTHER PUBLICATIONS

Orchestrating a brighter world:NEC—Advanced Image Analytics—Behaviour Detection Solution—NEC Corporation—Safer City Solution Division—System Development Department—7-1, Shiba 5-chome, Minatoku, Tokyo—2019 NEC Corporation, all pages.

Kedarisetti, Dharanish, et al.: "Metadata Aided Camera Search", Motorola Solutions, Inc.,2020, pp. 1-2.

* cited by examiner

METHOD, SYSTEM AND COMPUTER PROGRAM PRODUCT FOR REDUCING LEARNING TIME FOR A NEWLY INSTALLED CAMERA

BACKGROUND

With the increasing prevalence of video cameras in modern day society, suspicious/unusual object activity recognition from security video is an active research and development area in the field of video analytics and computer vision. Through installation of a system of video cameras, object activities can be monitored in sensitive and public areas (such as bus stations, railway stations, airports, banks, shopping malls, school and colleges, parking lots, roads, etcetera) to prevent terrorism, theft, accidents and illegal parking, vandalism, fighting, chain snatching, crime and other suspicious or unusual activities. It may be difficult and expensive to watch public places continuously. Thus, artificial intelligence-powered video security solutions are becoming a more and more compelling security-related investment directed towards the monitoring of object activities, and also the selective categorizing of those object activities as usual/non-suspicious or unusual/suspicious.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
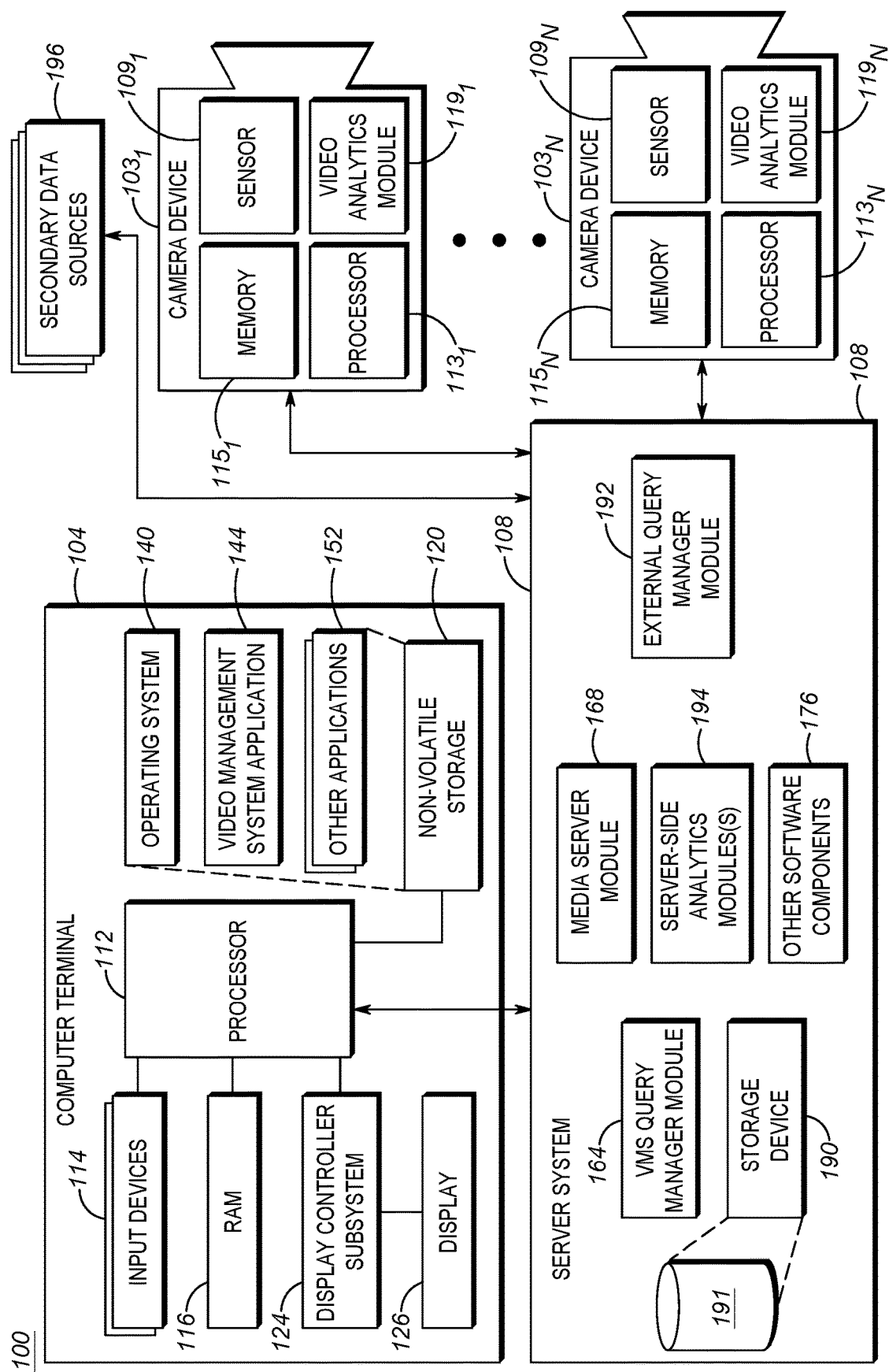
FIG. 1 is a block diagram of a security system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a computer-implemented method for a set up of a fixed video camera that has a first Field Of View (FOV). The computer-implemented method includes logically dividing the first FOV into a plurality of partial FOV regions. Each partial FOV region of the partial FOV regions has at least one respective static object appearing therein. The computer-implemented method also includes determining that at least one of the partial FOV regions and at least a part of at least one second FOV of at least one other fixed video camera have at least one same static object appearing therein for both. The computer-implemented method also includes generating a new unusual activity model for the fixed video camera, based on a portion of an existing and established unusual activity model built for the at least one other fixed video camera relating to the at least one same static object.

According to another example embodiment, there is provided a computer-implemented method carried out within a security system that includes a plurality of fixed video cameras including a first fixed video camera and a second fixed video camera. The computer-implemented method includes running a first unusual activity model in respect of the first fixed video camera. The computer-implemented method also includes running a second unusual activity model in respect of the second fixed video camera. A first part of a static object can be seen within a first Field Of View (FOV) of the first fixed video camera and a second different part of the static object can be seen within a second FOV of the second fixed video camera. The computer-implemented method also includes employing the first fixed video camera to capture a plurality of video images. The computer-implemented method also includes employing video analytics on metadata derived from a portion of the video images, in which the static object is depicted, to determine that a temporary change in environments of the first and second FOVs is occurring or will occur. The computer-implemented method also includes temporarily changing, within the security system, aspects of application of both the first unusual activity model and the second unusual activity model to reflect the temporary change in the environments.

According to another example embodiment, there is provided a system including a first fixed video camera that has a first Field Of View (FOV), and a second fixed video camera that has a second FOV. The system also includes at least one tangible computer-readable storage medium in communication with at least the second fixed video camera, and the storage medium storing an existing and established unusual activity model for the second fixed video camera. The system also includes at least one processor in communication with at least the storage medium and the first fixed video camera. The at least one processor is configured to logically divide the first FOV into a plurality of partial FOV regions. Each partial FOV region of the plurality of partial FOV regions has at least one respective static object appearing therein. The at least one processor is also configured to determine that at least one of the partial FOV regions and at least a part of the second FOV of the second fixed video camera have at least one same static object appearing therein for both. The at least one processor is also configured to generate a new unusual activity model for the first fixed video camera, based on a portion of the existing and established unusual activity model built for the second fixed video camera relating to the at least one same static object.

Each of the above-mentioned embodiments will be discussed in more detail below, starting with example system and device architectures of the system in which the embodiments may be practiced, followed by an illustration of processing blocks for achieving an improved technical method, system and computer program product for reducing learning for a newly installed camera. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include moving objects such as, for instance, humans, vehicles, animals, etcetera. Examples of objects also include static objects such as, for instance, buildings, roads, fixtures, etcetera.

Further advantages and features consistent with this disclosure will be set forth in the following detailed description, with reference to the figures.

Referring now to the drawings, and in particular FIG. 1 which is a block diagram of an example security system 100 within which methods in accordance with example embodiments can be carried out. Included within the illustrated security system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108. In some examples, part or all of the server system 108 is provided within the security system 100 by way of a cloud computing implementation.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems. The display controller subsystem 124 interacts with display 126 and it renders graphics and/or text upon the display 126.

Still with reference to the computer terminal 104 of the security system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, Video Management System (VMS) application 144, and other applications 152, or parts thereof, may be temporarily loaded into a volatile store such as the RAM 116. The processor 112, in addition to its operating system functions, can enable execution of the various software applications on the computer terminal 104.

Regarding the VMS application 144, this can be run on the computer terminal 104 and may include a search User Interface (UI) module for cooperation with a search session manager module in order to enable a computer terminal user to carry out actions related to providing input in relation images, live video and video recordings (such as, for example, input to facilitate annotating or selectively exporting video footage captured by one or more video security cameras, providing responses to alerts in relation to unusual/suspicious activities, etcetera). Also, regarding the aforementioned search session manager module, this provides a communications interface between the search UI module and a VMS query manager module 164 of the server system 108. In at least some examples, the search session manager module communicates with the VMS query manager module 164 through the use of Remote Procedure Calls (RPCs).

The VMS query manager module 164 receives and processes queries originating from the computer terminal 104, which may facilitate retrieval and delivery of various sorts of data and metadata as herein later described in more detail. In this regard, the VMS query manager module 164 is communicatively coupled to an at least one storage device 190 (described later herein in more detail).

Referring once again to FIG. 1, the server system 108 includes several software components (besides the VMS query manager module 164 already described) for carrying out other functions of the server system 108. For example, the server system 108 includes a media server module 168. The media server module 168 handles client requests related to storage and retrieval of security video taken by camera devices $103_1$-$103_n$ in the security system 100. In some examples, the media server module 168 may carry out other functions in relation to other forms of media communicated to the computer terminal 104 from the server system 108 (for example, facilitating the delivery of video clip alarms of unusual activity to the VMS application 144 to be viewed on the display 126 of the computer terminal 104). The server system 108 also includes server-side analytics module(s) 194 which can include, in some examples, any suitable one of known commercially available software that carry out computer vision related functions (complementary to any video analytics performed in the cameras) as understood by a person of skill in the art. The server system 108 also includes an external query manager module 192 configured to query secondary data sources 196 (described later herein in more detail).

The server system 108 also includes a number of other software components 176. These other software components will vary depending on the requirements of the server system 108 within the overall system. As just one example, the other software components 176 might include special test and debugging software, or software to facilitate version updating of modules within the server system 108.

Regarding the at least one storage device 190, this comprises, for example, one or more databases 191 which may facilitate the organized storing of recorded security video, non-video sensor data, etcetera in accordance with example embodiments. The one or more databases 191 may also contain metadata related to, for example, the recorded security video that is storable within one or more storages. The one or more databases 191 may also contain other types of metadata besides video metadata. Examples of metadata other than video metadata, that may be stored in the one or more databases 191, include audio metadata, GPS location metadata, etcetera. In some examples, the at least one storage device 190 may store a plurality of unusual activity models for a respective some or all of video cameras within the security system 100. These unusual activity models may be derived from, for example, historical metadata of activities of moving objects in captured video. Unusual activity models may inform as to normal and unusual characteristics for movement and appearance/disappearance of objects including, for example, normal speed (e.g. normal range) of certain typical objects of interest, normal direction (e.g. normal direction) of the certain typical objects of interest, etcetera.

The illustrated security system 100 includes a plurality of camera devices $103_1$-$103_n$ (hereinafter interchangeably referred to as "cameras $103_1$-$103_n$" when referring to all of the illustrated cameras, or "camera 103" when referring to any individual one of the plurality) being operable to capture a plurality of images and produce image data representing the plurality of captured images. The camera 103 is an image capturing device and includes security video cameras. Furthermore, it will be understood that the security system 100 includes any suitable number of cameras (i.e. n is any suitable integer greater than one).

The camera 103 includes an image sensor 109 for capturing a plurality of images. The camera 103 may be a digital video camera and the image sensor 109 may output captured light as a digital data. For example, the image sensor 109 may be a CMOS, NMOS, or Charge-Couple Device (CCD). In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the security system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared and/or ultraviolet range. In other examples, the camera 103 may have similarities to a "multi-sensor" type of camera, such that the camera 103 includes pairs of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a pan-tilt-zoom camera, dome camera, in-ceiling camera, box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, physical access control device, video game console or controller.

The camera 103 includes one or more processors 113, one or more video analytics modules 119, and one or more memory devices 115 coupled to the processors and one or more network interfaces. Regarding the video analytics module 119, this generates metadata outputted to the server system 108. The metadata can include, for example, records which describe various detections of objects such as, for instance, pixel locations for a detected moving object in respect of a first record and a last record for the camera within which the respective metadata is being generated.

Also, it is contemplated that the camera 103 may have different operational modes. For instance, operation of the camera 103 may, after initial installation, be set or default to a learning mode associated with building an unusual activity model for that camera. Later, after the unusual activity model is built, the camera may then enter into a normal/established mode of operation. In some examples, the learning mode lasts two weeks. In other example, the learning mode is any suitable amount of time that may be greater or less than two weeks.

Regarding the memory device 115 within the camera 103, this can include a local memory (such as, for example, a random access memory and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store in memory (including store in volatile memory, non-volatile memory, dynamic memory, etc. or any combination thereof).

Continuing with FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN).

The one or more secondary data sources 196 may be external or internal to the illustrated security system 100. The secondary data sources 196 may include storage devices that store various types of secondary data as described in more detail subsequently herein. In some example, the secondary data sources may be in the cloud and/or located in third party systems, auxiliary systems, etc.

In some examples, the secondary data sources 196 are coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the secondary data sources 196 and the server system 108 can be any number of known arrangements, examples of which were previously herein detailed. In at least one example embodiment, the secondary data sources 196 and the server system 108 are within the same Local Area Network (LAN). In some examples, the secondary data sources 196 may be coupled to the server system 108 in a more direct manner than as described above.

Figure 2:
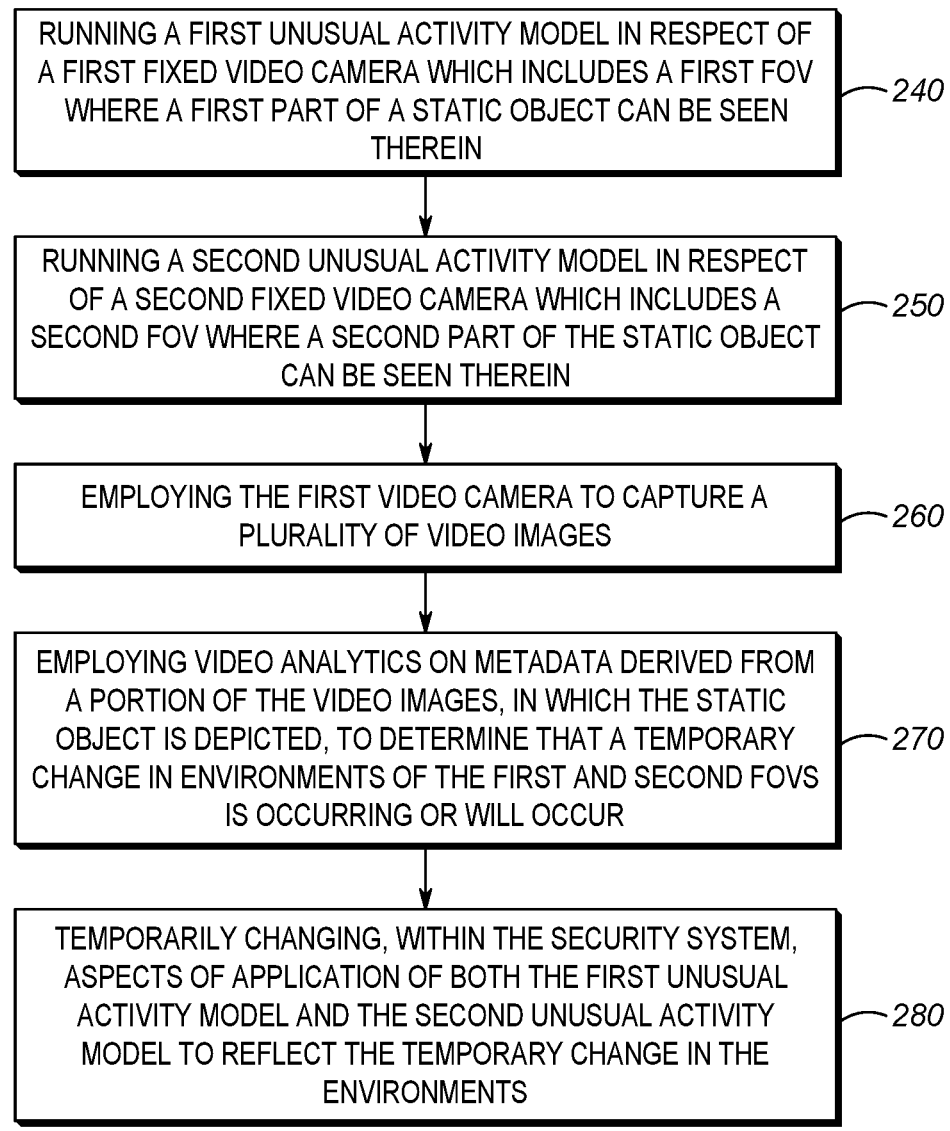
FIG. 2 is a flow chart illustrating a method in accordance with an example embodiment.
Figure 3:
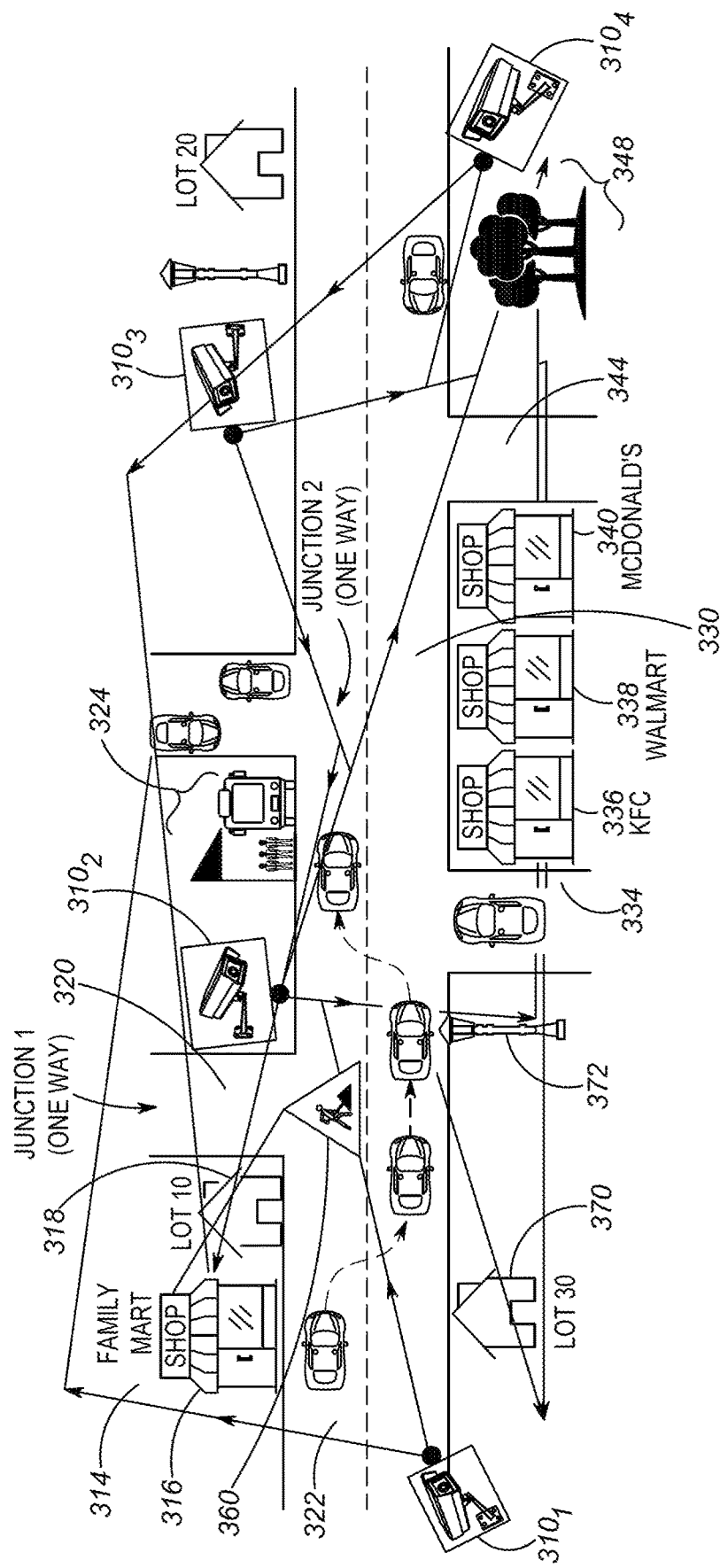
FIG. 3 is a schematic diagram of a practical implementation, in accordance with example embodiments, of the security system of FIG. 1.

Reference is now made to FIGS. 2 and 3. FIG. 2 is a flow chart illustrating a method 230 in accordance with an example embodiment. FIG. 3 is a schematic diagram of a practical implementation, in accordance with example embodiments, of the security system 100 of FIG. 1.

Referring to FIG. 2, the illustrated method 230, which in some examples is carried out within the security system 100, includes running (240) a first unusual activity model in respect of a first fixed video camera. For example, in FIG. 3 four fixed video cameras $310_1$-$310_4$ are shown, and for convenience of illustration we may refer to the fixed video camera $310_1$ as the "first fixed video camera". Also, it will be understood that each of the fixed video cameras $310_1$-$310_4$ may be similar to the camera 103 previously herein described and, just as was the case in respect of FIG. 1, instead of four video cameras (as shown) it is contemplated that there may instead be any suitable number of video cameras.

The fixed video camera $310_1$ has a Field Of View (FOV) 314 (region in between two illustrated lines that extend from the fixed video camera $310_1$) and a respective "first unusual activity model". Within the FOV 314 are various static objects including "Family Mart" store 316, "Lot 10" 318, uni-directional traffic road 320, bi-directional traffic road 322, the fixed video camera $310_2$ (assuming it has a housing large enough to be detected) and bus stop 324.

Next the method 230 includes running (250) a second unusual activity model in respect of a second fixed video camera. For example, for convenience of illustration we may refer to the fixed video camera $310_2$ as the "second fixed video camera".

The fixed video camera $310_2$ has an FOV 330 (region in between two illustrated lines that extend from the fixed video camera $310_2$) and a respective "second unusual activity model". Within the FOV 330 are various static objects including the bi-directional traffic road 322, driveway 334, "KFC" restaurant 336, "Walmart" store 338, "McDonald's" restaurant 340, driveway 344 and park 348 (note: the park 348 is technically a plurality of geographically proximate static objects collectively treated as a single static object entity). Thus, the bi-directional traffic road 322 is a static object that appears in both the FOV 314 of the fixed video cameras $310_1$ and the FOV 330 of the fixed video camera $310_2$. In particular, a first part of the bi-directional traffic road 322 is visible within the FOV 314, and a second (different) part of the bi-directional traffic road 322 is visible within the FOV 330.

Next the method 230 includes employing (260) the first video camera to capture a plurality of video images. For example, the fixed video camera $310_1$ captures a plurality of video images. In the illustrated example embodiment of FIG. 3, these video images depict, amongst other objects and respective activity, road construction activity 360. For example, the road construction activity 360 may be visually identifiable by one or more of the following telltale indicators: traffic cones, hardhats being worn by workers, construction signage, etc.

Next the method 230 includes employing (270) video analytics on metadata derived from a portion of the video images, in which the static object is depicted, to determine that a temporary change in environments of the first and second FOVs is occurring or will occur. Thus in the illustrated example embodiment of FIG. 3, video analytics is carried out on the aforementioned plurality of video images captured by the fixed video camera $310_1$. From this video analytics, information about the temporary environment change (i.e. the road construction activity 360 in the case of the illustrated example embodiment) is determined. For example, if date range information is provided on construction signage, then through some process such as optical character recognition, that information may be acquired for use by the server-side analytics module(s) 194 (FIG. 1). As another example of acquirable information, say a company logo is present on an exterior portion of construction equipment, then by first determining the company entity, a query may be made (for example, the external query manager module 192 may be actuated to query to the secondary data sources 196 shown in FIG. 1) to obtain information regarding the road construction activity 360 such as, for instance, date and/or time duration for the temporary environment change.

Next the method 230 includes temporarily changing (280) aspects of application of both the first unusual activity model and the second unusual activity model to reflect the temporary change in the environments. For example, the video analytics within the security system 100 (FIG. 1) may identify, for instance, changed vehicle behavior along the bi-directional traffic road 322 (in the example embodiment of FIG. 3, traffic in the area of the road construction activity 360 is reduced to a single lane, and so some vehicles are forced to drive in a lane, where such activity would otherwise be considered unusual, and so by operation of instructions run on at least one processor, that activity is set to "normal" for the temporary circumstances).

Figure 4:
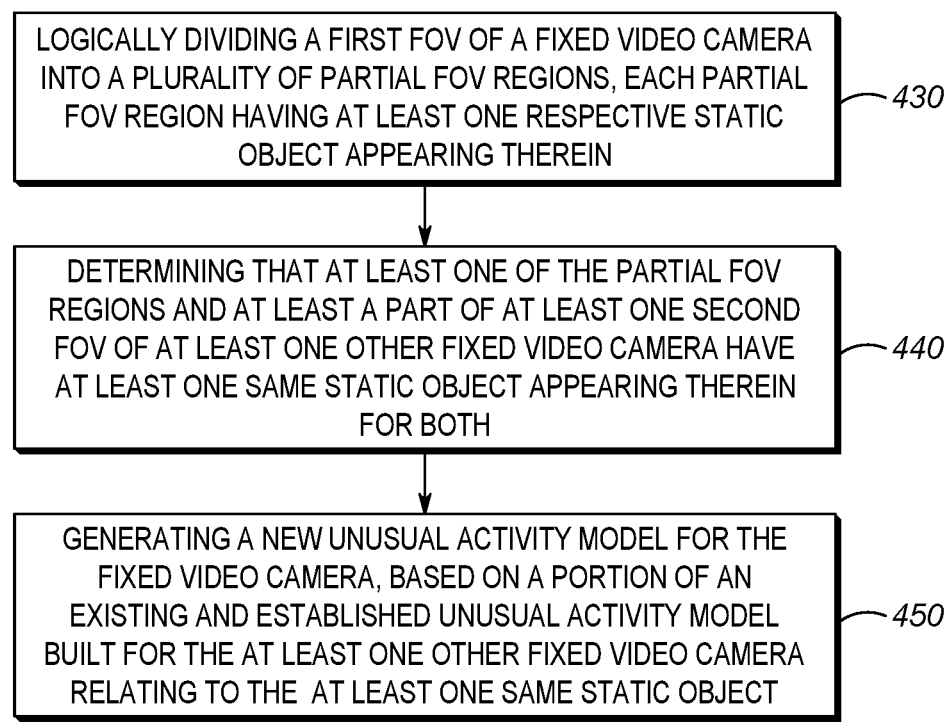
FIG. 4 is a flow chart illustrating a method in accordance with another example embodiment.

Reference is now made to FIG. 4 (with continued reference to FIG. 3). FIG. 4 is a flow chart illustrating a method 420 in accordance with an example embodiment.

Referring to FIG. 4, the illustrated method 420, which in some examples is carried out within the security system 100, includes logically dividing (430) a first FOV of a fixed video camera into a plurality of partial FOV regions (with each partial FOV region having at least one respective static object appearing therein). For instance, with reference to the example embodiment of FIG. 3, say fixed video camera $310_3$ is a new video camera that has just been physically installed. A full FOV of the fixed video camera $310_3$ can be divided into any suitable number of partial FOV regions based on each partial FOV region covering at least one respective static object. For example, a first partial FOV region for the fixed video camera $310_3$ can correspond to coverage for the following static objects: "Lot 30" 370, and street light 372; and a second partial FOV region for the fixed video camera $310_3$ can correspond to coverage for the driveway 334, the KFC restaurant 336, the Walmart store 338, the McDonald's restaurant 340, and the driveway 344.

Next the method 420 includes determining (440) that at least one of the partial FOV regions and at least a part of at least one second FOV of an at least one other fixed video camera have at least one same static object appearing therein for both. For instance, and again with reference to the example embodiment of FIG. 3, say that the at least one other fixed video camera is the fixed video camera $310_2$, then a part of the FOV the fixed video camera $310_2$ has coverage for static objects that are also covered within part of the FOV of the fixed video camera $310_3$ as detailed in Table 1 below.

TABLE 1

Static Objects-Visible in Which FOVs

| Static Object | Covered by Which Fixed Video Camera(s)? |
|---|---|
| "Lot 30" 370 | Fixed video camera $310_3$ only |
| Street Light 372 | Fixed video camera $310_3$ only |
| Driveway 334 | Both fixed video cameras |
| KFC Restaurant 336 | Both fixed video cameras |
| Walmart Store 338 | Both fixed video cameras |
| McDonald's Restaurant 340 | Both fixed video cameras |
| Driveway 344 | Both fixed video cameras |
| Park 348 | Fixed video camera $310_2$ only |

Thus the partial FOV regions for common coverage of same static objects corresponds to those partial FOV regions where the following static objects appear: the driveway 334, the KFC restaurant 336, the Walmart store 338, the McDonald's restaurant 340, and the driveway 344. In respect of the fixed video camera $310_3$ (example embodiment of FIG. 3), and as previously mentioned, these five static objects correspond to the second partial FOV region (making up a part of the full FOV of the fixed video camera $310_3$).

Next the method 420 includes generating (450) a new unusual activity model for the fixed video camera, based on a portion of an existing and established unusual activity model built for the at least one other fixed video camera relating to the at least one same static object. In respect of example embodiment of FIG. 3, the fixed video camera $310_2$ has an existing and established unusual activity model camera. By contrast, the fixed video camera $310_3$ does not have an existing and established unusual activity model camera (since it has been just installed without a model building/set up having been run for a set up duration of time). Consequently, set up time in respect of the part of the new unusual activity model that can be built from partial FOV(s) of existing and established unusual activity model(s) of other camera(s) may result in reduced set up time in relation to the replicated part (i.e. the part of the unusual activity model relating to the second partial FOV region for the fixed video camera $310_3$ which may be replicated from a corresponding part of the existing and established unusual activity model from the fixed video camera $310_2$).

In some examples, the new unusual activity model is built from more than one partial FOVs of existing and established unusual activity model of more than one respective other cameras. In some examples, a similarity score is determined (for instance, a similarity score as between the relevant FOV of the fixed video camera $310_3$ and the relevant FOV of the fixed video camera $310_2$. If a threshold is exceeded in respect of the similarity score than the new unusual activity model for the new fixed video camera may be based at least almost entirely on the existing and established unusual activity model of the older fixed video camera.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and cannot generate, modify and/or employ unusual activity models for fixed video cameras, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method for a set-up setup of a fixed video camera that has a first Field Of View (FOV), the computer-implemented method comprising:
   logically dividing the first FOV into a plurality of partial FOV regions, each partial FOV region having at least one respective static object appearing therein;
   determining that at least one of the partial FOV regions and at least a part of at least one second FOV of at least one other fixed video camera have at least one same static object appearing therein for both; and
   generating a new unusual activity model for the fixed video camera, based on a portion of an existing and established unusual activity model built for the at least one other fixed video camera relating to the at least one same static object,
   wherein the at least one other fixed video camera comprises a first other fixed video camera having the second FOV and a second other fixed video camera having a third FOV, and
   the generating of the new unusual activity model for the fixed video camera is based on:
      the portion of the existing and established unusual activity model built for the first other fixed video camera, and
      a portion of another existing and established unusual activity model built for the second other fixed video camera.

2. The computer-implemented method as claimed in claim 1 wherein the new unusual activity model and the existing and established unusual activity model are at least in part derived from historical metadata of activities of moving objects in video captured by the at least one other fixed video camera.

3. The computer-implemented method as claimed in 2 wherein the video captured by the at least one other fixed video camera spans a duration of time greater than or equal to two weeks.

4. The computer-implemented method of claim 1 wherein the same static object extends between the first FOV and the second FOV such that a first part of the same static object can be seen within the first FOV and a second different part of the same static object can be seen within the second FOV.

5. The computer-implemented method of claim 1 wherein the new unusual activity model informs as to at least one of normal speed of certain typical objects of interest and normal direction of the certain typical objects of interest.

6. A computer-implemented method for a setup of a fixed video camera that has a first Field Of View (FOV), the computer-implemented method comprising:
   logically dividing the first FOV into a plurality of partial FOV regions, each partial FOV region having at least one respective static object appearing therein;
   determining that at least one of the partial FOV regions and at least a part of at least one second FOV of at least one other fixed video camera have at least one same static object appearing therein for both;
   generating a new unusual activity model for the fixed video camera, based on a portion of an existing and established unusual activity model built for the at least one other fixed video camera relating to the at least one same static object; and
   determining whether a similarity score as between the first FOV and the second FOV exceeds a threshold,
   wherein when the threshold is exceeded, then the generating of the new unusual activity model for the fixed video camera is based at least almost entirely on the existing and established unusual activity model.

7. A computer-implemented method carried out within a security system that includes a plurality of fixed video cameras including a first fixed video camera and a second fixed video camera, and the computer-implemented method comprising:
   running a first unusual activity model in respect of the first fixed video camera;
   running a second unusual activity model in respect of the second fixed video camera, and wherein a first part of a static object can be seen within a first Field Of View (FOV) of the first fixed video camera and a second different part of the static object can be seen within a second FOV of the second fixed video camera;
   employing the first fixed video camera to capture a plurality of video images;
   employing video analytics on metadata derived from a portion of the video images, in which the static object is depicted, to determine that a temporary change in environments of the first and second FOVs is occurring or will occur; and
   temporarily changing, within the security system, aspects of application of both the first unusual activity model and the second unusual activity model to reflect the temporary change in the environments.

8. The computer-implemented method of claim 7 wherein:
   the portion of the video images further depicts signage, one or more letters, or one or more codes, and
   the employing the video analytics includes carrying out a recognition process on the signage, the one or more letters, or the one or more codes.

9. The computer-implemented method of claim 7 wherein the employing the video analytics includes a detection of an at least one temporary object on or near the static object, and the at least one temporary object being associated with a type of temporary activity.

10. The computer-implemented method of claim 7 further comprising confirming or obtaining additional information regarding the temporary change in the environments by accessing information available from at least one external source.

11. A system comprising:
   a first fixed video camera that has a first Field Of View (FOV);
   a second fixed video camera that has a second FOV;
   a third fixed video camera having a third FOV;
   at least one tangible computer-readable storage medium in communication with at least the second fixed video camera, and the storage medium storing an existing and established unusual activity model for the second fixed video camera; and
   at least one processor in communication with at least the storage medium and the first fixed video camera, the at least one processor configured to:

logically divide the first FOV into a plurality of partial FOV regions, each partial FOV region having at least one respective static object appearing therein;

determine that at least one of the partial FOV regions and at least a part of the second FOV of the second fixed video camera have at least one same static object appearing therein for both; and generate a new unusual activity model for the first fixed video camera, based on a portion of the existing and established unusual activity model built for the second fixed video camera relating to the at least one same static object;

wherein the new unusual activity model for the first fixed video camera is based on:

the portion of the existing and established unusual activity model built for the second fixed video camera, and a portion of another existing and established unusual activity model built for the third fixed video camera.

12. The system as claimed in claim 11 wherein the new unusual activity model and the existing and established unusual activity model are at least in part derived from historical metadata of activities of moving objects in video captured by the second fixed video camera.

13. The system as claimed in claim 12 wherein the video captured by the second fixed video camera spans a duration of time greater than or equal to two weeks.

14. The system of claim 11 wherein the same static object extends between the first FOV and the second FOV such that a first part of the same static object can be seen within the first FOV and a second different part of the same static object can be seen within the second FOV.

15. The system of claim 11 wherein the new unusual activity model informs as to at least one of normal speed of certain typical objects of interest and normal direction of the certain typical objects of interest.

16. A system comprising:

a first fixed video camera that has a first Field Of View (FOV);

a second fixed video camera that has a second FOV;

at least one tangible computer-readable storage medium in communication with at least the second fixed video camera, and the storage medium storing an existing and established unusual activity model for the second fixed video camera; and at least one processor in communication with at least the storage medium and the first fixed video camera, the at least one processor configured to:

logically divide the first FOV into a plurality of partial FOV regions, each partial FOV region having at least one respective static object appearing therein;

determine that at least one of the partial FOV regions and at least a part of the second FOV of the second fixed video camera have at least one same static object appearing therein for both;

generate a new unusual activity model for the first fixed video camera, based on a portion of the existing and established unusual activity model built for the second fixed video camera relating to the at least one same static object; and determine whether a similarity score as between the first FOV and the second FOV exceeds a threshold, and wherein when the threshold is exceeded, then the new unusual activity model for the first fixed video camera, when generated by the at least one processor, is based at least almost entirely on the existing and established unusual activity model.

17. The computer-implemented method of claim 6 wherein the new unusual activity model and the existing and established unusual activity model are at least in part derived from historical metadata of activities of moving objects in video captured by the at least one other fixed video camera.

18. The computer-implemented method of claim 6 wherein the video captured by the at least one other fixed video camera spans a duration of time greater than or equal to two weeks.

19. The system of claim 16 wherein the new unusual activity model and the existing and established unusual activity model are at least in part derived from historical metadata of activities of moving objects in video captured by the second fixed video camera.

20. The system of claim 16 wherein the new unusual activity model informs as to at least one of normal speed of certain typical objects of interest and normal direction of the certain typical objects of interest.

* * * * *